United States Patent [19]

Hopkins, Sr. et al.

[11] 4,159,050
[45] Jun. 26, 1979

[54] COMBINATION POWER TOOL

[75] Inventors: Charles E. Hopkins, Sr., Baltimore; Robert G. Moores, Jr., Reisterstown, both of Md.

[73] Assignee: Black & Decker Inc., Newark, Del.

[21] Appl. No.: 806,751

[22] Filed: Jun. 15, 1977

[51] Int. Cl.² .................... B23B 21/00; F16D 11/00
[52] U.S. Cl. .................... 192/34; 144/32 R; 192/67 R; 192/93 A; 192/114 R
[58] Field of Search ............... 192/34, 67 R, 93 A, 192/93 R, 114 A; 144/32 R

[56] References Cited

U.S. PATENT DOCUMENTS

| | | | |
|---|---|---|---|
| 1,008,309 | 11/1911 | Cushman | 192/93 A |
| 1,096,052 | 5/1914 | Plank | 192/93 A |
| 1,438,486 | 12/1922 | Gorman | 192/93 A |
| 2,105,218 | 1/1938 | Kirby | 192/93 A |
| 2,857,997 | 10/1958 | Graybill | 192/34 |
| 2,950,626 | 8/1960 | Short | 192/34 X |

Primary Examiner—Allan D. Herrmann
Attorney, Agent, or Firm—Walter Ottesen; Leonard Bloom; Edward D. Murphy

[57] ABSTRACT

A combination power tool has a housing defining a bore with an annular bearing member mounted in the bore. A first clutch is rotatably mounted in the housing and a second clutch is rotatably mounted in the annular bearing member and movable relative to said first clutch between a first position whereat the second clutch firmly engages the first clutch and a second position whereat the second clutch is disengaged from the first clutch. A spring biases the second clutch into its second position. The annular bearing member is movably mounted in the bore for engaging the second clutch member to counteract the urging force of the spring and to displace the second clutch from the second position into the first position. A face cam formed on the annular bearing member and a cam follower is located on the housing for coacting with the face cam to guide the annular bearing member when the same is moved along the bore to bring the second clutch into its first position. An annular collar mounted on the annular bearing member and spring loaded detent pins coact to hold the annular bearing member in place when the same has been moved along the bore and the second clutch is in its first position. The cam arrangement permits the operator of the tool to quickly shift the tool from one mode to the other mode of operation simply by rotating the annular bearing member through a small angle.

41 Claims, 12 Drawing Figures

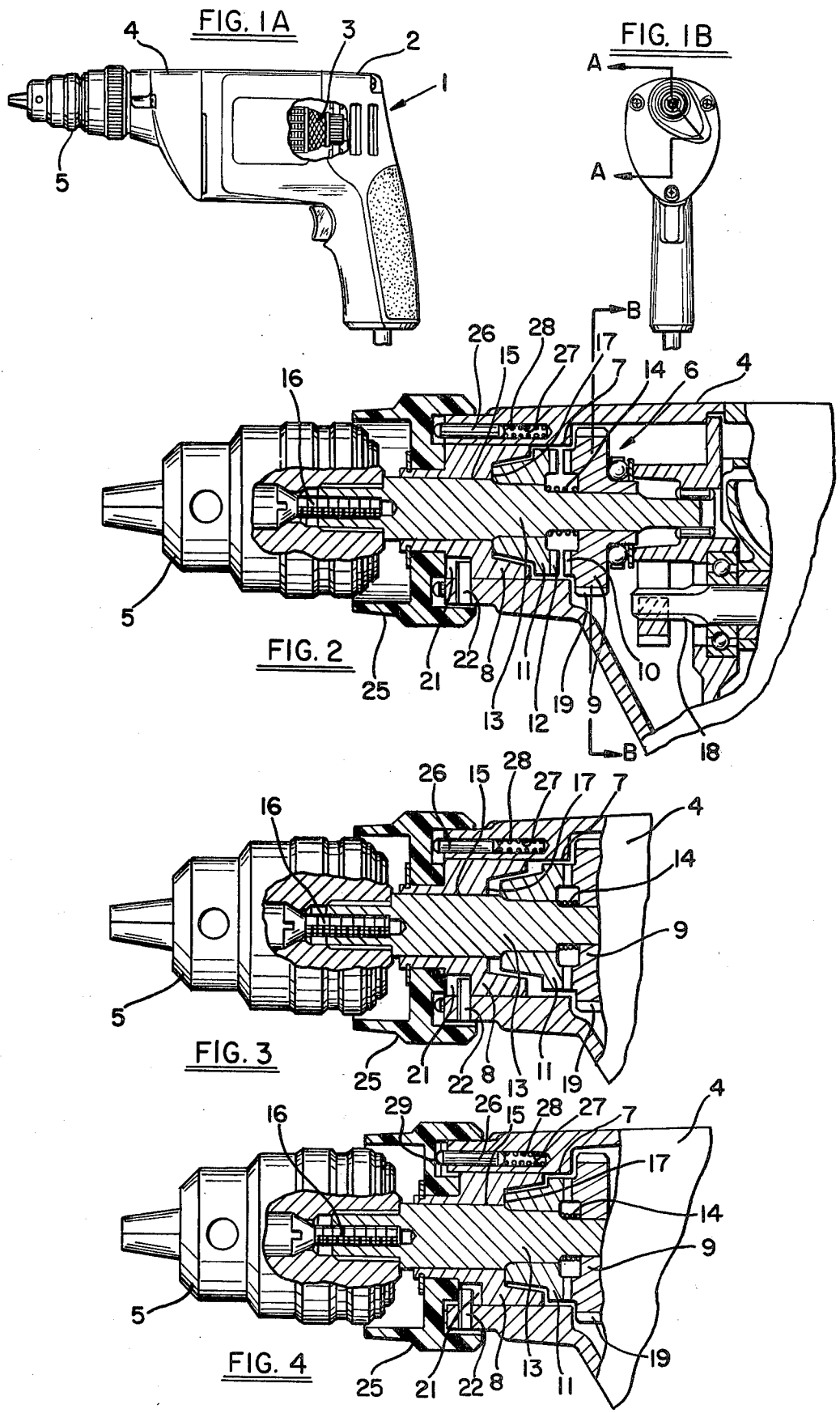

U.S. Patent    Jun. 26, 1979    Sheet 3 of 3    4,159,050
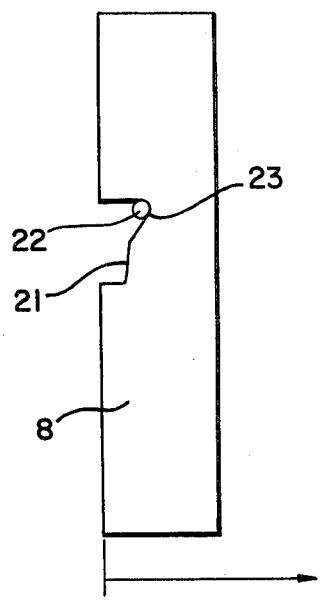
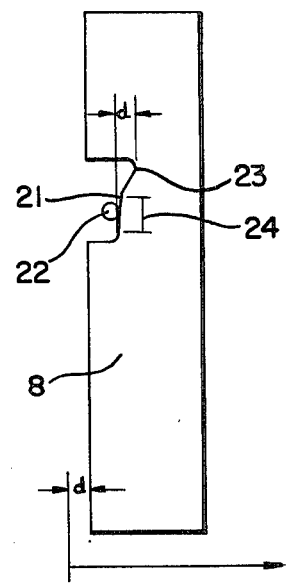
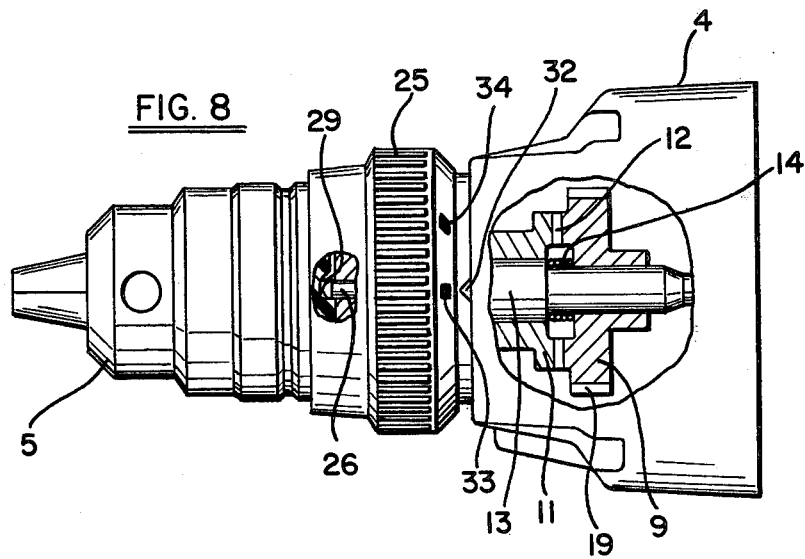
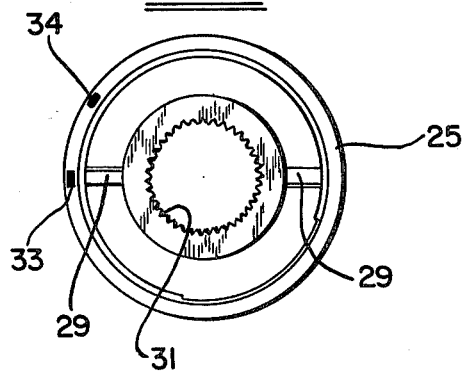

COMBINATION POWER TOOL

BACKGROUND OF THE INVENTION

The invention is directed to power operated tools that are adjustable to provide either a positive drive connection between the motor and tool element or a drive connection that can be established and interrupted at will by the person operating the tool when required by the nature of the work.

Although not necessarily limited thereto, the invention is advantageously embodied in a portable electric tool that combines the features of a drill and a screwdriver in an efficient and compact unit that is especially easy to operate.

Power tools such as a combination drill and screwdriver have clutch members which include a first clutch rotatably mounted in the housing of the tool. An annular bearing is movably mounted in a bore of the housing. A second clutch is rotatably mounted in the annular bearing and is movable relative to the first clutch between the first position whereat the two clutches firmly engage; and, a second position whereat the second clutch is positioned axially away from the first clutch so that the clutches are disengaged. The two clutches are held apart with the aid of biasing means usually in the form of a coil spring which biases the second clutch away from the first clutch. This condition corresponds to the screwdriver mode. When the operator has the tool in the screwdriving mode, he places the tool against the fastener and then exerts pressure on the tool causing the clutches to engage and the screwdriver bit to turn. When the fastener tightens in the workpiece, a ratcheting action occurs because the clutches become disengaged thereby preventing the fastener from becoming stripped or damaged.

In the prior art devices of which we are aware, the adjustment of the clutches so as to bring them into the drill mode is achieved as suggested for example by U.S. Pat. No. 2,950,626 to Short wherein an annular bearing holds a spindle with the second clutch integral therewith. The bearing threadably engages the housing of the tool so that when the operator rotates the annular bearing, it causes the second clutch to be moved axially so as to come into firm, positive engagement with the first clutch driven by the tool motor thereby placing the tool in the drill mode.

The device of Short includes a spindle bearing threadably engaging a housing and has the disadvantage that the operator must rotate the spindle bearing as much as a whole revolution in order to cause the clutches to positively engage for the drill mode. Further, there is the disadvantage that housing must be specially threaded to accommodate the spindle bearing which is a costly manufacturing step.

Also, the means for holding the spindle bearing in place and the second clutch in position during operation of the tool in the drill mode has the disadvantage that during continuous operation, the clutches can become disengaged. For example, the above-mentioned patent to Short discloses a Nylon plug mounted in the motor housing of the tool which can be adjusted so as to press hard against the outer thread of the spindle bearing with which the spindle bearing threadably engages the motor housing. However, in time, the plug wears and it becomes necessary to frequently retighten the plug in the housing against this thread.

SUMMARY OF THE INVENTION

In view of the foregoing it is the object of our invention to provide a combination tool of the type discussed above wherein a simple and easy hand motion will shift the tool from drill mode to screwdriver mode or vice versa. More specifically, it is an object of our invention to provide such a tool wherein the operator need only move the annular bearing through a small angle and distance to shift the tool from one operating mode to the other.

It is another object of our invention to provide a combination drill and screwdriver wherein a holding arrangement is provided to hold the clutch members together in firm engagement in the drill mode as well as to give a positive indication when the second clutch is in its position corresponding to the screwdriving mode.

It is still another object of our invention to provide a combination drill and screwdriver which can be manufactured and assembled at lower cost.

The invention differs from the prior art devices described above in that the combination tool according to the invention incorporates the feature of a cam arrangement at the interface of the annular spindle bearing and tool housing which permits the shift from the drill mode to the screwdriving mode by the operator to be both quick and positive. The cam is contoured so that a rotation of the annular bearing holding the spindle will cause the annular bearing to move rapidly along the bore of the tool housing in which it is mounted and move the second clutch into engagement with the first clutch. The second clutch is an integral part of the spindle held in the bore of the annular bearing. The cam arrangement at the interface of the clutch housing and bearing member permits the bearing member to be accommodated in a bore formed in the clutch housing. This eliminates the need for cutting an internal thread into the clutch housing for receiving the annular bearing member as is the case in the prior art tool discussed and contributes to reducing the cost of the finished product while at the same time improves performance and reliability.

The power tool according to our invention includes a housing member defining a bore for accommodating the annular bearing. A first clutch is rotatably mounted in the housing and a second clutch is mounted in the annular bearing so as to be movable relative to the first clutch between a first position whereat the second clutch firmly engages the first clutch and a second position whereat the second clutch is disengaged from the first clutch. A means for biasing the second clutch into its second position is also provided and can be in the form of a coil spring for example. The annular bearing member is movably mounted in the bore of the housing member and engages the second clutch member to counteract the urging force of the biasing means to displace the second clutch from its second position into its first position. A cam arrangement is provided at the interface of the annular bearing member and housing member. In a preferred embodiment of our invention, the cam arrangement includes a face cam formed on one of the members and a cam follower is located on the other one of the members for coacting with the face cam to guide the annular bearing member when the same is moved along the bore to bring the second clutch into its first position. A position holding means is provided for holding the annular bearing member in place when the same has been moved along the bore and the second clutch is in its first position and in positive engagement with the first clutch. Preferably, the face cam is formed on the annular bearing member and a cam follower is mounted on the housing member for coacting with the face cam as described.

According to another embodiment, a first surface means can be formed on the housing member. Likewise, a suitable second surface means can be formed on the annular bearing member.

Respective face cams can be formed on these first and second surface means for coacting with each other to guide the annular bearing when the same is rotatingly moved along the bore to bring the second clutch into engagement with the first clutch. The face cams are formed so that their respective cam surfaces extend substantially perpendicular to the longitudinal axis of the bore formed in the housing member in which the annular bearing member is mounted.

As mentioned, another advantage of our invention is that the second clutch is firmly held in engagement with the first clutch when the tool is in the drill mode. This is achieved with the aid of position holding means for holding the annular bearing member in place when it has been moved along the bore and the second clutch is in its first position. The position holding means can include, for example, a collar fixedly mounted to the annular bearing member. Detent stop means in the form of a spring-loaded pin arranged in the housing and a detent in the annular collar serve to hold the annular bearing member in a position corresponding to the drill mode wherein the first and second clutches are firmly engaged.

A further advantage of our invention is that the tool can be shifted from one mode to another rapidly with very little effort on the part of the operator. By utilizing a non-linear cam and by contouring the surface thereof, a rapid movement of the bearing member is achieved.

Although our invention is especially adaptable to a combination drill and screwdriver, it should not be deemed to be so limited. The principles of the invention are applicable in power tools whenever it is desired to provide a positive engagement of the clutches between the drive motor and the tool element held by the tool when the tool is operated in one mode or when it is desired to selectively engage and disengage the clutch members in another operative mode.

BRIEF DESCRIPTION OF THE DRAWING

The above and other objects and advantages of the invention will become more apparent from a reading of the specification taken in conjunction with the enclosed drawings, in which:

FIG. 1A is a side elevation view of a combination portable electric drill and screwdriver tool according to the invention;

FIG. 1B is a front elevation view of tool shown in FIG. 1A;

FIG. 2 is a side elevation view of the front end of the tool including the gear case housing partially cut away and in section taken along line A—A of FIG. 1B to show the annular bearing member and clutches disengaged for operation of the tool in the screwdriver mode;

FIG. 3 is likewise a side elevation view partially in section taken along line A—A of FIG. 1B and shows the clutch teeth engaged with the tool in the screwdriver mode after the operator has engaged a screw and has applied pressure to the tool;

FIG. 4 is also a side elevation view partially in section along line A—A of FIG. 1B and shows the annular bearing member moved so as to bring the clutches into mutually engagement for operation of the tool in the drill mode;

FIG. 7A illustrates an expanded plan view of the outer bearing surface of the annular bearing member and shows the cam follower pin in the position of the screwdriving mode;

FIG. 7B is likewise an expanded plan view of the outer bearing surface of the annular bearing member and shows the position of the cam follower pin on the face cam corresponding to the drill mode;

FIG. 8 is plan view of the top of the tool looking down on the gear case housing cut-away at two locations;

FIG. 9 is an elevation view of the adjusting collar and shows the detents formed therein into which the detent pins are urged when the tool is in the drill mode; and, FIG. 10 illustrates an alternate embodiment of the cam arrangement for achieving the rapid movement of the annular bearing member for shifting the tool between operating modes.

DESCRIPTION OF THE PREFERRED EMBODIMENTS OF THE INVENTION

Figure 6:
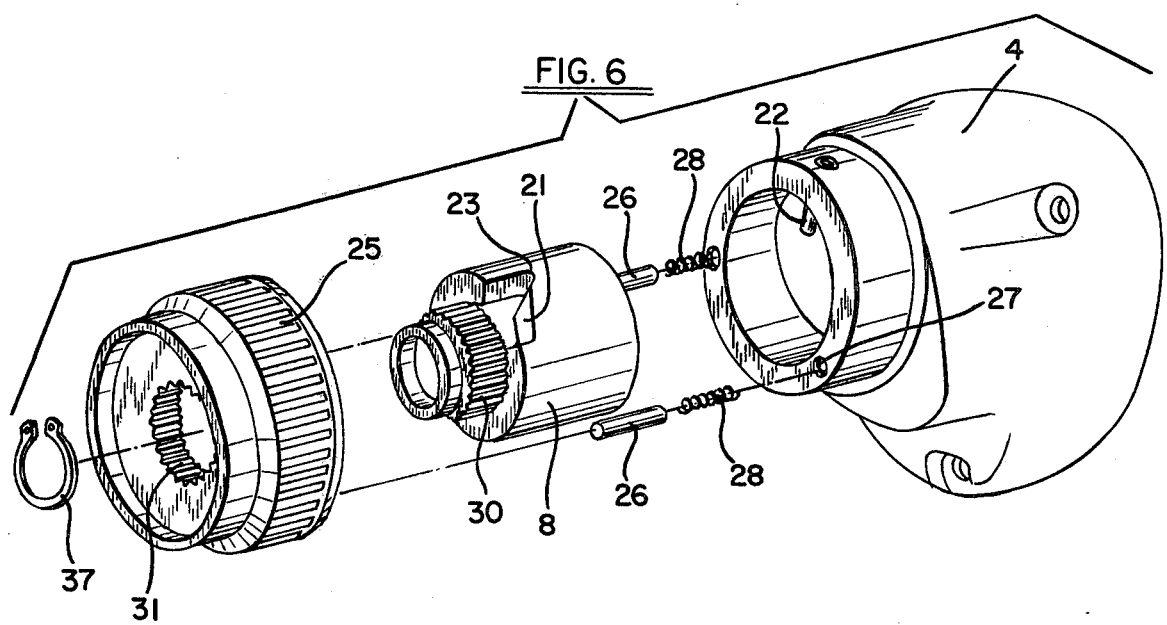
FIG. 6 is an assembly view showing the individual parts of the clutch mechanism in perspective.

Referring now to the drawing, FIG. 1A illustrates a portable power operated combination drill and screwdriver according to the invention. A portion of the motor housing 2 is broken away to expose the motor 3 to view. The clutch mechanism is contained in the gear and clutch housing 4. A tool holding chuck 5 is shown in outline form and holds the tool element (not shown) such as a drill bit, screwdriver bit or the like.

A portion of the gear and clutch housing 4 is shown cut away in FIG. 2 to expose the clutch arrangement 6. The gear and clutch housing 4 includes an inner bore 7 in which annular bearing member 8 is mounted. The annular bearing member 8 is preferably made of powdered metal. A first clutch 9 having clutch teeth 10 is slideably mounted on spindle 13 at the rear portion of the gear and clutch housing 4 and a second clutch 11 having clutch teeth 12 is fixedly mounted to spindle 13 by press-fitting for example.

Biasing means in the form of a coil spring 14 biases the second clutch 11 away from the first clutch 9. The spindle 13 is slideably carried by the annular bearing member 8 at the inner bearing surface 15 thereof. The tool element holder 5 is mounted with the aid of a screw 16 to the left end of the spindle 13.

The spindle 13 can slide on the inner bearing surface 15 in the direction of the longitudinal axis of the annular bearing member 8 so that the second clutch 11 is movable relative to the first clutch 9 between a first position whereat the second clutch firmly engages the first clutch 9 (FIG. 3) and a second position whereat the second clutch 11 is disengaged from the first clutch 9 (FIG. 2).

FIG. 2 then shows the clutch arrangement 6 for the screwdriving mode wherein the operator has not yet applied pressure to the tool 1 to drive a fastener such as a screw.

FIG. 3 also illustrates the combination drill and screwdriver in the screwdriver mode, however, for the condition of the clutch arrangement 6 where the operator of the tool is applying pressure to the tool to drive a fastener, say a screw, (not shown). Accordingly, the spindle 13 and the clutch 11 are displaced to the right axially with respect to the bearing member 8 into the first position whereat the second clutch 11 firmly engages with the first clutch 9 and the spring 14 is in compression. Thus, in the screwdriving mode, shown in FIG. 3, the annular bearing member 8 is still at the same location shown in FIG. 2 and the spindle 13 and second clutch 11 have been pushed axially into the tool so that the first and second clutches are in mutual engagement. When the fastener tightens in the workpiece, the clutches begin to ratchet in the conventional manner to prevent the fastener from becoming stripped or otherwise damaged.

In FIG. 4, the combination drill and screwdriver has been placed in its drill mode so that the annular bearing member 8 has been moved in the housing bore 7 from the one location shown in FIGS. 2 and 3 to the other location shown in FIG. 4 so that it engages the second clutch member to counteract the urging force of the biasing means 14 and holds the second clutch 11 in its first position. In the position for bearing member 8 shown in FIG. 4 the first and second clutches are held in firm engagement with each other.

More specifically, the annular bearing member 8 is mounted in the bore 7 of the housing 4 so as to be shiftable from one location (FIGS. 2 and 3) therein corresponding to the screwdriving mode of the tool to another location (FIG. 4) therein corresponding to the drill mode of the tool. The annular bearing member 8 is arranged in the bore 7 for engaging the second clutch 11 to counteract the urging force of the spring 14 and to displace the second clutch 11 from its second position into its first position when the annular bearing member 8 is shifted from the one location shown in FIGS. 2 and 3 to the other location shown in FIG. 4. When the annular bearing member 8 is in the position shown in FIG. 4, it holds the second clutch 11 at its back end 17 in positive and firm engagement with the first clutch 9. The clutches 9 and 11 can be seen in firm engagement also in the right-hand break-out of FIG. 8.

Figure 5:
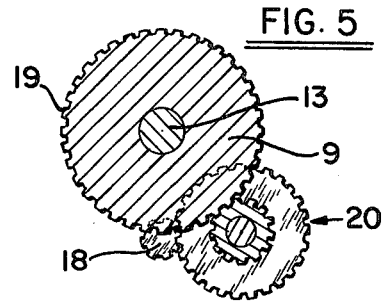
FIG. 5 is a view taken along line B—B of FIG. 2 and shows only the gear reduction arrangement mechanically connecting the motor pinion to the first clutch of the clutch arrangement.

Referring now to FIG. 5, the first clutch 9 is driven by motor 3 having a drive pinion 18 mechanically coupled to a gear 19 formed on the clutch 9. Between the pinion and gear is interposed a suitable gear reduction means designated by reference numeral 20 in FIG. 5.

A cam arrangement is provided at the interface of the annular bearing member 8 and the housing 4 for guiding the annular bearing member 8 in its movement along the inner bearing surface 7. According to a preferred embodiment of our invention, the cam arrangement includes a face cam 21 formed on the annular bearing member 8 as shown in perspective in FIG. 6. The cam follower of the cam arrangement is in the form of a pin 22 mounted in the housing 4. The pin 22 is preferably a roll pin that is, a small metal sleeve having a single longitudinal split facing away from the face cam; however, it can be in the form of a roller bearing which would minimize friction between the cam follower and the cam surface.

A comparison of FIG. 3 with FIG. 4 shows that the cam follower pin 22 is at a different location on the face cam 21 in each of these views. FIGS. 7A and 7B are expanded plan views of the annular bearing member 8 and shows the positions of the annular bearing member 8 relative to the pin 22 corresponding to FIGS. 3 and 4 respectively. The pin 22 is fixed in the housing 4 so that it is the annular bearing member 8 which moves relative to the pin 22. FIG. 7A corresponds to the screwdriving mode and shows the cam follower pin 22 in a notch 23 of the face cam 21. FIG. 7B shows the cam follower pin 22 on the face cam 21 at region 24 and corresponds to the drill mode.

As the annular bearing member 8 rotated along the bearing surface of the bore 7 in housing 4, the bearing member 8 is also shifted axially along the axis of the bore 7 a distance d; this becomes evident from a comparison of FIG. 7A and 7B. The rotation of the bearing member 8 is also evident by comparing position of the face cam 21 relative to the fixed pin 22 in FIGS. 7A and 7B. Thus, when the annular bearing member 8 is rotated in the housing 4, the face cam 21 moves with respect to the cam follower pin 22 fixed in position in the housing 4. Accordingly, as the tool is shifted into the drill mode, the face cam 21 rides the pin 22 and the annular bearing member 8 engages and pushes the clutch 11 axially toward the clutch 9, thereby bringing the clutch 11 into its first position and compressing the spring 14; or, when shifting to the screwdriving mode, the bearing member rides the cam follower pin 22 back to the position shown in FIG. 7A and the spring 14 returns the spindle 13 and clutch 11 to the second position.

The notch 23 is located on bearing member 8 in angular position and axial depth with respect to region 24 of the face cam 21 so that when annular member is rotated to seat the pin 22 in the notch 23, the teeth of the clutches will be disengaged and the tool will be in the screwdriving mode. The notch 23 acts as a detent to hold the annular bearing member in the screwdriver mode position. Also, it prevents the annular bearing member from rotating within the bore 7 as it would otherwise do because of the bearing action of the rotating spindle 13 at the bearing spindle interface at the bearing surface 15. By providing a non-linear face cam as described above, the operator can quickly shift the tool from one mode to the other mode merely by rotating the annular bearing member through a small angle of no more than, say 60°.

The cam 21 is held in the position shown in FIG. 7B with the aid of position holding means which can include, for example, an operator-adjustable annular collar 25 fixedly mounted to the annular bearing member 8 and detent stop means made up of a detent 29 formed in an end face of the annular collar 25 and detent pin 26 arranged in bore 27 of housing 4 with a spring 28 urging the detent pin 26 towards the left into pressing engagement with the detent 29 in annular collar 25 as shown in FIG. 4 and with special clarity in the left hand break-out of FIG. 8. FIG. 9 is an elevation view of the annular collar 25 and shows two detents 29. Although one detent and detent pin would be sufficient, two detents and corresponding spring-loaded detent pins cause the detent pin spring load on the annular collar 25 to be balanced and preclude a couple action which would make it difficult for the operator to rotate the annular bearing member 8 and collar 25.

The above-described position holding means is one found to work effectively and provides the operator with an audible "click" when the pin 26 enter the corresponding detents 29 indicating he is in the drill mode. Other position holding means can likewise be utilized to hold the annular collar 25 in position; or, if desired, the position holding means could be dispensed with entirely if the slope of the cam surface 21 is selected to be sufficiently low that the friction of the pin against this surface is sufficient to hold the annular bearing member in place during the drill mode. The friction force developed can be augmented by forming the cam surface 21 in the bearing member 8 such that when the spindle 13 rotates in the bearing member 8, it will transmit a frictional force to the bearing member 8 at its inner bearing surface 15 which will tend to cause the bearing member to rotate causing the bearing member 8 to wedge with its cam surface 21 against the pin 22 at the region 24 holding the bearing member stationary and in place corresponding to the drill mode.

When the tool is assembled, the annular bearing member 8 is positioned in the bore 7 of housing 4 so that the clutches 11 and 9 are firmly engaged and the cam surface 21 is positioned with respect to pin 22 as shown in FIG. 7B. Before the annular collar 25 is fixedly attached to the annular bearing member 8 with the bearing member 8 in the position just described, the annular collar 25 is first adjusted in angular position so that the detent pins 26 engage the corresponding detents 29. The collar 25 is then placed on bearing member 8 and this marks the position of the annular bearing member for the drill mode. Thus, each time the operator moves the tool into the drill mode, he will rotate the collar 25 and therewith the annular bearing member 8 such that the detents 29 are engaged. This will cause the cam follower pin 22 to always occupy the same position on the face cam 21 and the clutches 9 and 11 will be firmly engaged and held in mutual engagement by the bearing member 8 each time the tool is placed in the drill mode.

Referring to FIG. 6 it is noted that both the annular bearing member 8 and the annular collar 25 are provided with serrations 30 and 31, respectively constituting serrated interface means. The serrations insure that the annular collar 25 can be located accurately on the annular bearing member 8 so that the detent pins 26 line up with the detents 29 formed in the annular collar 25. The serrations further assure that the annular collar 25 will not shift with respect to the annular bearing member 8 after the tool has been assembled thereby assuring that each time the operator places the tool in the drill mode a firm positive engagement of the clutch members is provided thereby minimizing wear on the clutch teeth and precluding slippage in the drill mode for the life of the tool. The collar 25 is preferably made of a moldable plastic material such as glass-filled Nylon as this makes it unnecessary to perform any machining operations thereon.

Referring to FIG. 8 an indicating arrow 32 formed on the top of the housing 4 points to a marker 33 indicating that the tool is in the drill mode. A further marker 34 serves to indicate the screwdriving mode.

Figure 10:
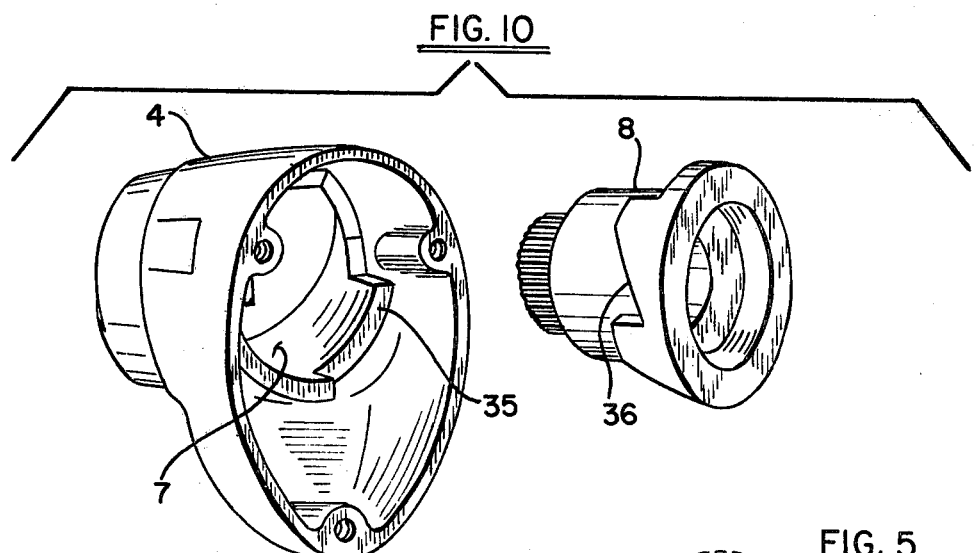

It will be appreciated that the teachings of the present invention are equally applicable to a wide variety of cam arrangements, and that the essence of the present invention is not necessarily confined to the particular form of the cam arrangement shown in FIGS. 7A and 7B. With this in mind reference is now made to FIG. 10 which illustrates an alternate embodiment of a cam arrangement wherein the housing 4 is provided with a first surface means formed thereon extending substantially perpendicular to the longitudinal axis of the bore 7 of the housing 4. The annular bearing member 8 has a second surface means formed thereon likewise extending perpendicular to the longitudinal axis of the bore 7.

A face cam 35 is formed on the first surface means and a corresponding face cam 36 is formed on the second surface means. These face cams coact with each other to guide the annular bearing member 8 when the same is rotatingly moved along the bore to bring the second clutch into its first position and into engagement with the first clutch.

We claim:

1. In a hand-held, portable power tool, the combination of:
   a housing member defining a bore;
   an annular bearing member mounted in said bore;
   a first clutch part rotatably mounted in said housing;
   a second clutch part rotatably mounted in said annular bearing member and movable relative to said first clutch part between a first position whereat said second clutch part firmly engages said first clutch part and a second position whereat said second clutch part is disengaged from said first clutch part;
   means biasing said second clutch part into said second position;
   said annular bearing member being movably mounted in said bore for engaging said second clutch part to counteract the urging force of said biasing means and to displace said second clutch part from said second position into said first position;
   a face cam formed on one of said members;
   a cam follower located on the other one of said members for coacting with said face cam to guide said annular bearing member when the same is moved along said bore to bring said second clutch part into said first position; and,
   detent means formed on said face cam for removably holding said annular bearing member at a location along said bore corresponding to said second position of said second clutch part.

2. The combination of claim 1, said face cam being non-linear and having a first and second portions corresponding to said first and second positions of said second clutch part, respectively, said first portion having a slope selected to ensure that the friction between said cam follower and said first portion is sufficient to hold said annular bearing member in place whereby said annular bearing member holds said second clutch part in said first position.

3. The combination of claim 2 wherein said face cam is formed on said annular bearing member and said cam follower is a pin mounted on said housing member.

4. In a power tool, the combination of:
   a housing member defining a bore;
   an annular bearing member mounted in said bore;
   a first clutch rotatably mounted in said housing;
   a second clutch rotatably mounted in said annular bearing member and movable relative to said first clutch between a first position whereat said second clutch firmly engages said first clutch and a second position whereat said second clutch is disengaged from said first clutch;
   means biasing said second clutch into said second position;
   said annular bearing member being movably mounted in said bore for engaging said second clutch member to counteract the urging force of said biasing means and to displace said second clutch from said second position into said first position;
   a face cam formed on one of said members;

a cam follower located on the other one of said members for coacting with said face cam to guide said annular bearing member when the same is moved along said bore to bring said clutch into said first position;

detent means formed on said face cam for removable holding said annular bearing member at a location along said bore corresponding to said second position of said second clutch part; and, position holding means for holding said annular bearing member in place when the same has been moved along said bore and said second clutch is in its first position.

5. The combination of claim 4 wherein said position holding means for holding said annular bearing member includes:

an annular collar fixedly mounted on said annular bearing member; and, detent stop means for holding said annular collar and said annular bearing member in place when said second clutch part is in said first position.

6. The combination of claim 5 wherein said face cam is non-linear and is formed on said annular bearing member and said cam follower is a pin mounted on said housing member.

7. The combination of claim 6 wherein said non-linear face cam has a notch formed therein at one end thereof to accommodate said pin when said second clutch part is in said second position.

8. In a hand-held, portable power tool, the combination of:

a housing member defining a bore;

an annular bearing member mounted in said bore;

a first clutch part rotatably mounted in said housing;

a second clutch part rotatably mounted in said annular bearing member and movable relative to said first clutch part between a first position whereat said second clutch firmly engages said first clutch part and a second position whereat said second clutch part is disengaged from said first clutch part;

means biasing said second clutch part into said second position;

said annular bearing member being movably mounted in said bore for engaging said second clutch member to counteract the urging force of said biasing means and to displace said second clutch part from said second position into said first position;

a non-linear face cam formed on one of said members; and, a cam follower mounted on the other one of said members for coacting with said face cam to guide said annular bearing member when the same is moved along said bore to bring said second clutch part into said first position.

9. The combination of claim 8 wherein said non-linear face cam is formed on said annular bearing member and said cam follower is a pin mounted on said housing member.

10. The combination of claim 9 wherein said non-linear face cam has a notch formed therein at one end thereof to accommodate said pin when said second clutch part is in said second position.

11. In the combination of claim 10 wherein said position holding means for holding said annular bearing member including:

an annular collar fixedly mounted on said annular bearing member; and, detent stop means for holding said annular collar and said annular bearing member in place when said second clutch part is in said first position.

12. In a power tool, the combination of:

a housing member defining a bore and having a first surface means formed thereon extending substantially perpendicular to the longitudinal axis of said bore;

an annular bearing member mounted in said bore;

a first clutch part rotatably mounted in said housing;

a second clutch part rotatably mounted in said annular bearing member and movable relative to said first clutch between a first position whereat said second clutch part firmly engages said first clutch part and a second position whereat said second clutch part is disengaged from said first clutch part;

means biasing said second clutch part into said second position;

said annular bearing member being movably mounted in said bore for engaging said second clutch part to counteract the urging force of said biasing means and to displace said second clutch part from said second position into said first position, said annular bearing member having second surface means formed thereon likewise extending substantially perpendicular to said longitudinal axis; and, respective saw-tooth face cams formed on said first and second surface means for coacting with each other to guide said annular bearing member when the same is rotatingly moved along said bore to bring said second clutch part into said first position.

13. The combination of claim 12 comprising:

position holding means for holding said annular bearing member in place when the same has been moved along said bore and said second clutch part is in said first position.

14. In a power-driven drill and screwdriver, the combination of:

a housing member defining a bore;

an annular bearing member mounted in said bore;

a first clutch part rotatably mounted in said housing;

a second clutch part rotatably and slideably mounted in said annular bearing member and movable relative to said first clutch part between a first position whereat said second clutch part firmly engages said first clutch part and a second position whereat said second clutch part is disengaged from said first clutch part;

means biasing said second clutch part into said second position;

said annular bearing member being mounted in said bore so as to be shiftable from one location therein corresponding to the screwdriving mode of the tool to another location therein corresponding to the drill mode of the tool, said annular bearing member being arranged in said bore for engaging said second clutch part from said second position into said first position when said bearing member is shifted from said one location to said other location;

a face cam formed on one of said members;

a cam follower located on the other one of said members for coacting with said face cam to guide said annular bearing member when the same is moved along said bore to bring said second clutch into said first position; and, detent means formed on said face cam for removably holding said annular bearing member at a location along said bore corresponding to said second position of said second clutch part.

15. The combination of claim 14, said face cam being non-linear and having a first and second portions corresponding to said first and second positions of said second clutch part, respectively, said first portion having a slope selected to ensure that the friction between said cam follower and said first portion is sifficient to hold said annular bearing member in place whereby said annular bearing member holds said second clutch part in said first position.

16. The combination of claim 15, wherein the slope of said first portion is inclined in the direction of rotation of said second clutch part.

17. In a power-driven drill and screwdriver, the combination of:
a housing member defining a bore;
an annular bearing member mounted in said bore;
a first clutch part rotatably mounted in said housing;
a second clutch part rotatably mounted in said housing and movable relative to said first clutch part between a first position whereat said second clutch part firmly engages said first clutch part and a second position whereat said second clutch part is disengaged from said first clutch part;
means biasing said second clutch part into said second position;
said annular bearing member being mounted in said bore so as to be shiftable from one location therein corresponding to the screwdriving mode of the tool to another location therein corresponding to the drill mode of the tool, said annular bearing member being arranged in said bore for engaging said second clutch part to counteract the urging force of said biasing means and to displace said second clutch part from said second position into said first position when said bearing member is shifted from said one location to said other location;
a face cam formed on one of said members;
a cam follower located on the other one of said members for coacting with said face cam to guide said annular bearing member when the same is moved along said bore to bring said second clutch part into said first position;
detent means formed on said face cam for removably holding said annular bearing member at a location along said bore corresponding to said second position of said second clutch part; and,
position holding means for holding said annular bearing member in place when the same has been moved along said bore and said second clutch part is in its first position.

18. The combination of claim 17 wherein said position holding means for holding said annular bearing member including:
an annular collar fixedly mounted on said annular bearing member; and,
detent stop means for holding said annular collar and said annular bearing member in place when said second clutch part is in said first position.

19. The combination of claim 18 wherein said face cam is formed on said annular bearing member and said cam follower is a pin mounted on said housing member.

20. The combination of claim 18 comprising:
serrated interface means for fixedly holding said annular collar in place on said annular bearing member irrespective of the angular position of said annular bearing member when said annular collar is mounted on said annular bearing member.

21. In a power-driven drill and screwdriver, the combination of:
a housing member defining a bore;
an annular bearing member mounted in said bore;
a first clutch part rotatably mounted in said housing;
a second clutch part rotatably and slideably mounted in said annular bearing member and movable relative to said first clutch part between a first position whereat said second clutch part firmly engages said first clutch part and a second position whereat said second clutch part is disengaged from said first clutch part;
means biasing said second clutch part into said second position;
said annular bearing member being mounted in said bore so as to be shiftable from one location therein corresponding to the screwdriving mode of the tool to another location therein corresponding to the drill mode of the tool, said annular bearing member being arranged in said bore for engaging said second clutch part to counteract the urging force of said biasing means and to displace said second clutch part from said second position into said first position when said bearing member is shifted from said one location to said other location;
a non-linear face cam formed on one of said members;
a cam follower located on the other one of said members for coacting with said face cam to guide said annular bearing member when the same is moved along said bore to bring said second clutch part into said first position; and
position holding means for holding said annular bearing member in place when the same has been moved along said bore and said second clutch part is in its first position.

22. The combination of claim 21 wherein said position holding means for holding said annular bearing member includes:
an annular collar fixedly mounted on said annular bearing member; and,
detent stop means for holding said annular collar and said annular bearing member in position when said second clutch part is in said first position.

23. The combination of claim 22 comprising:
serrated interface means for fixedly holding said annular collar in place on said annular bearing member irrespective of the angular position of said annular biasing member when said annular collar is mounted on said annular bearing member.

24. The combination of claim 23 wherein said non-linear face cam is formed on said annular bearing member and said cam follower is a pin mounted on said housing member.

25. The combination of claim 24 wherein said non-linear face cam has a notch formed therein at one end thereof to accommodate said pin when said second clutch part is its second position.

26. A power-driven drill and screwdriver comprising:
a motor housing;
a motor mounted in said housing;
a clutch housing member secured to said motor housing and defining a bore;
an annular bearing member mounted in said bore;

a first clutch part rotatably mounted in said clutch housing and mechanically connected to said motor so as to be rotatable thereby;

a second clutch part rotatably and slideably mounted in said annular bearing member and movable relative to said first clutch part between a first position whereat said second clutch part firmly engages said first clutch part and a second position whereat said second clutch part is disengaged from said first clutch part;

means biasing said second clutch part into said second position;

said annular bearing member being mounted in said bore so as to be shiftable from one location therein corresponding to the screwdriving mode of the tool to another location therein corresponding to the drill mode of the tool, said annular bearing member being arranged in said bore for engaging said second clutch part to counteract the urging force of said biasing means and to displace said second clutch part from said second position into said first position when said annular bearing member is shifted from said one location to said other location;

a face cam formed on one of said members;

a cam follower located on the other one of said members for coacting with said face cam to guide said annular bearing member when the same is moved along said bore to bring said second clutch part into said first position; and, detent means formed on said face cam for removably holding said annular bearing member at location along said bore corresponding to said second position of said second clutch part.

27. A power-driven drill and screwdriver of claim 26, said face cam being non-linear and having a first and second portions corresponding to said first and second positions of said second clutch part, respectively, said first portion having a slope selected to ensure that the friction between said cam follower and said first portion is sufficient to hold said annular bearing member in place whereby said annular bearing member holds said second clutch part in said first position.

28. The power-driven drill and screwdriver of claim 27, wherein said non-linear face cam is formed on said annular bearing member said cam follower is a roll pin mounted on said housing member.

29. A power-driven drill and screwdriver comprising:
a motor housing;
a motor mounted in said motor housing;
a clutch housing member secured to said motor housing and defining a bore;
an annular bearing member mounted in said bore;
a first clutch part rotatably mounted in said clutch housing and mechanically connected to said motor so as to be rotatable thereby;
a second clutch part rotatably and slideably mounted in said annular bearing member and movable relative to said first clutch part between a first position whereat said second clutch part firmly engages said first clutch part and a second position whereat said second clutch part is disengaged from said first clutch part;
means biasing said second clutch part into said second position;
said annular bearing member being mounted in said bore so as to be shiftable from one location therein corresponding to the screwdriving mode of the tool to another location therein corresponding to the drill mode of the tool, said annular bearing member being arranged in said bore for engaging said second clutch part to counteract the urging force of said biasing means and to displace said second clutch part from said second position into said first position when said annular bearing member is shifted from said one location to said other location;
a face cam formed on one of said members;
a cam follower located on the other one of said members for coacting with said face cam to guide said annular bearing member when the same is moved along said bore to bring said second clutch part into said first position;
detent means formed on said face cam for removably holding said annular bearing member at a location along said bore corresponding to said second position of said second clutch part; and,
position holding means for holding said annular bearing member in place when the same has been moved along said bore to said other location and said second clutch part is in its first position.

30. The power-driven drill and screwdriver of claim 29 wherein said position holding means for holding said annular bearing member includes:
an annular collar fixedly mounted on said annular bearing member; and,
detent stop means for holding said annular collar and said annular bearing member in position when said second clutch part is in said first position.

31. The power-driven drill and screwdriver of claim 29 comprising:
serrated interface means for fixedly holding said annular collar in place on said annular bearing member irrespective of the angular position of said annular bearing member when said annular collar is mounted on said annular bearing member.

32. The power-driven drill and screwdriver of claim 31 wherein said face cam is formed on said annular bearing member and said cam follower is a pin mounted on said housing member.

33. The power-driven drill and screwdriver of claim 32 wherein said face cam is non-linear and has a notch formed therein at one end thereof to accommodate said pin when said second clutch part is in said second position.

34. A power-driven drill and screwdriver comprising:
a motor housing;
a motor mounted in said motor housing;
a clutch housing member secured to said motor housing and defining a bore;
an annular bearing member mounted in said bore;
a first clutch part rotatably mounted in said clutch housing and mechanically connected to said motor so as to be rotatable thereby;
a second clutch rotatably and slideably mounted in said annular bearing member and movable relative to said first clutch part between a first position whereat said second clutch part firmly engages said first clutch part and a second position whereat said second clutch part is disengaged from said first clutch part;
means biasing said second clutch part into said second position;

said annular bearing member being mounted in said bore so as to be shiftable from one location therein corresponding to the screwdriving mode of the tool to another location therein corresponding to the drill mode of the tool, said annular bearing member being arranged in said bore for engaging said second clutch part to counteract the urging force of said biasing means and to displace said second clutch part from said second position into said first position when said annular bearing member is shifted from said one location to said other location;

a non-linear face cam formed on one of said members;

a cam follower located on the other one of said members for coacting with said face cam to guide said annular bearing member when the same is moved along said bore to bring said second clutch part into said first position; and, position holding means for holding said annular bearing member in place when the same has been moved along said bore to said other location and said second clutch part is in its first position.

35. The power-driving drill and screwdriver of claim 34 wherein said position holding means for holding said annular bearing member includes:

an annular collar fixedly mounted on said annular bearing member; and, detent stop means for holding said annular collar and said annular bearing member in position when said second clutch part is in said first position.

36. The combination of claim 35 comprising:

serrated interface means for fixedly holding said annular collar in place on said annular bearing member irrespective of the angular position of said annular bearing member when said annular collar is mounted on said annular member.

37. The power-driven drill and screwdriver of claim 35 wherein said non-linear face cam is formed on said annular bearing member and said cam follower is a pin mounted on said housing member.

38. The power-driven drill and screwdriver of claim 36 wherein said non-linear face cam has a notch formed therein at one end thereof to accommodate said pin when said second clutch part is in said second position.

39. A power-driven drill and screwdriver comprising:

a motor housing;

a motor mounted in said motor housing;

a clutch housing member secured to said motor housing and defining a bore and having a first surface means formed thereon extending substantially perpendicular to the longitudinal axis of said bore;

an annular bearing member mounted in said bore;

a first clutch part rotatably mounted in said clutch housing and mechanically connected to said motor so as to be rotatable thereby;

a second clutch part rotatably and slideable mounted in said annular bearing member and movable relative to said first clutch part between a first position whereat said second clutch part firmly engages said first clutch part and a second position whereat said second clutch part is disengaged from said first clutch part;

means biasing said second clutch part into said second position;

said annular bearing member being mounted in said bore so as to be shiftable from one location therein corresponding to the screwdriving mode of the tool to another location therein corresponding to the drill mode of the tool, said annular bearing member being arranged in said bore for engaging said second clutch part to counteract the urging force of said biasing means to displace said second clutch part from said second position into said first position when said annular bearing member is shifted from said one location to said other location, said annular bearing member having a second surface means formed thereon likewise extending substantially perpendicular to said longitudinal axis; and, respective saw-tooth face cams formed on said first and second surface means for coacting with each other to guide said annular bearing member when the same is rotatingly moved along said bore to bring said second clutch part into said first position.

40. The power-driven drill and screwdriver of claim 39 comprising:

position holding means for holding said annular bearing member in place when the same has been moved along said bore and said second clutch part is in its first position.

41. The power-driven drill and screwdriver of claim 39 wherein said position holding means for holding annular bearing member includes:

an annular collar fixedly mounted on said annular bearing member; and, detent stop means for holding said annular collar and said annular beaing member in position when said second clutch part is in said first position.

* * * * *